May 4, 1954  L. BESS  2,677,760
PULSE WIDTH DISCRIMINATOR
Filed Sept. 17, 1945

INVENTOR
LEON BESS
BY
ATTORNEY

Patented May 4, 1954

2,677,760

UNITED STATES PATENT OFFICE 2,677,760

PULSE WIDTH DISCRIMINATOR

Leon Bess, Boston, Mass., assignor, by mesne assignments, to the United States of America as represented by the Secretary of the Navy Application September 17, 1945, Serial No. 616,919

4 Claims. (Cl. 250—27)

This invention relates to discriminators and more particularly to pulse width discriminators which are responsive only to pulses of predetermined widths or time durations, independent of the time intervals between pulses, to provide an output of similar pulses, similarly spaced, which differ from the input pulses only in that the pulse width is changed and that each pulse is delayed by the same fixed predetermined time interval from its corresponding input pulse.

There have been developed in the past various radiant energy systems employing electromagnetic energy pulse transmission. In such systems it is important that there be no confusion as a result of interference from a spurious source, such as atmospheric noise or other radiant energy systems. Also, when such systems are used for military purposes, it is important in addition that military security be preserved. To prevent such interference and to preserve military security, various systems have been invented for coding and decoding such pulse transmissions, the details of one of such systems being disclosed in a copending application for a "Coded Data Transmission System," Serial No. 617,151, filed September 18, 1945 by Andrew B. Jacobsen. Up to the present, however, none of these systems would distinguish between pulses of slightly different widths or time durations. A decoder designed to operate with two microsecond pulses would operate equally well with input pulses of one or three microseconds duration as long as the proper time delay between pulses was maintained.

Accordingly, one object of this invention is to provide a circuit which will discriminate between pulses of electrical energy of one predetermined width or time duration and those of other widths or time durations.

Another object is to provide a circuit which can be incorporated in a decoder or other pulsed device to make it responsive only to sets or series of coded pulses of predetermined characteristics.

Still another object is to provide a pulse width discriminator which can be used in conjunction with a pulse decoder to make the decoder responsive only to pulses of electrical energy of one predetermined width or time duration.

Other and further objects will appear in the course of the following description when taken with the accompanying drawings in which.

Figure 1:
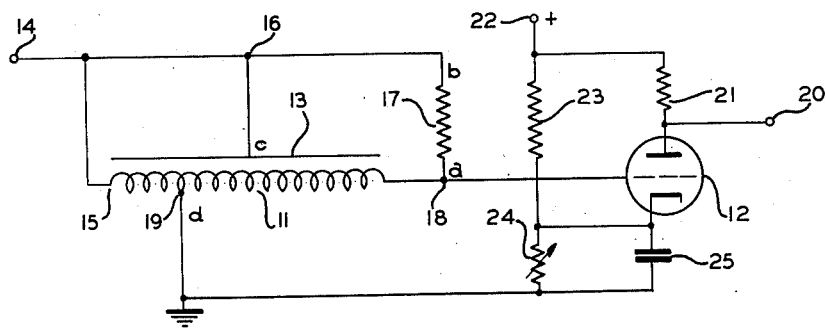
Fig. 1 illustrates one embodiment of this invention.

In Fig. 1 is shown an artificial delay line 11 and triode vacuum tube 12, having a grid, plate, and cathode. The cathode heater and heater circuit, being well-known to those skilled in the art, have been omitted for the sake of simplification of the diagram. Physically, delay line 11 is composed of a thin inductive coil surrounded by a cylindrical outer conductor or shield which is represented in Fig. 1 by straight line 13 adjacent the coil symbol. The input to the discriminator is connected to terminal 14, which is also connected to end 15 of delay line 11 and junction point 16. To junction point 16 is also connected shield 13 and one end of resistor 17, whose other end is connected to junction point 18. The impedance of resistor 17 is made equal to the characteristic impedance of delay line 11 in order to prevent reflections. Junction point 18 is also connected to the grid of tube 12 and to the other end of delay line 11. Delay line 11 is divided into two sections by tap or point 19 which is grounded; its location on the line will be treated more fully hereafter. The plate of tube 12 is connected to the output of the discriminator at terminal 20 and to one end of plate resistor 21. The other end of plate resistor 21 is connected to a suitable source of positive plate potential at terminal 22 and to one end of resistor 23. The cathode of tube 12 is connected to ground through variable cathode resistor 24 and cathode condenser 25 in parallel as shown and to the other end of resistor 23. As is apparent to those skilled in the art, resistors 23 and 24 in series constitute a voltage divider, and by the variation of resistor 24 the potential of the cathode of tube 12 above ground may be controlled. In operation this potential is adjusted so that tube 12 is so biased beyond cutoff that the tube will not be turned on by any single negative pulse applied to input terminal 14 unless it is of the proper width or time duration as hereafter described. If this discriminator is to be used in a chain of circuits, and if due to the preceding circuits there is a possibility of false operation of the discriminator by positive pulses applied to input 14, a clamper circuit, well-known to the art, may be placed just ahead of input 14 to prevent any positive pulses reaching input 14. Similarly, if it is necessary to protect the circuit against false operation by large negative pulses of other than the predetermined pulse width, a limiter tube may also be placed ahead of input 14 in order to limit the magnitude of all negative pulses to less than that required to turn the tube on. That a large negative pulse of any width applied to input terminal 14 could turn tube 12 on in the absence of a limiter will become apparent hereafter in this specification.

Figure 2:
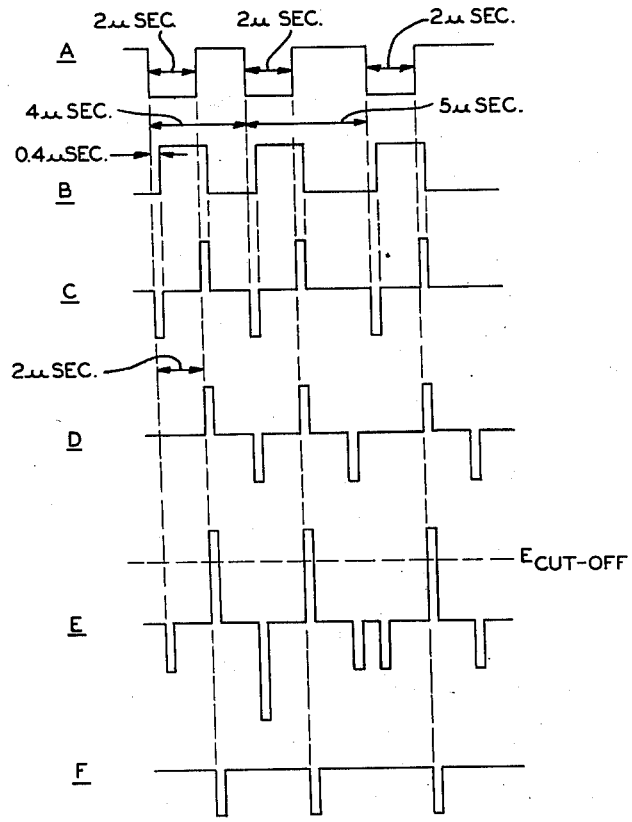
Fig. 2 shows the waveforms associated with the embodiment of Fig. 1.

To explain the operation of the circuit, assume that a series of three negative code voltage pulses, each of two microseconds duration, the second delayed four microseconds after the first and the third five microseconds after the second as shown in line A of Fig. 2, is applied to input terminal 14 of Fig. 1. Further assume that delay line 11 is so constructed as to give a two microsecond delay between tap 19 and its end connected to junction point 18 and a 0.2 microsecond delay between tap 19 and end 15. This series of pulses is impressed across line 11 at points C and D and will travel to the shorted end 15 and then will be reflected back inverted and delayed 0.4 microsecond to points C and D as shown in line B of Fig. 2. The result then at junction point 16 will be as shown in line C, which is the sum of the waveforms shown in lines A and B. As will be apparent to those skilled in the art, the result obtained so far is essentially the same that would be obtained by using a peaking or differentiating circuit in the respects that negative and positive pulses, respectively, are generated in time coincidence with the leading and trailing edges of each original negative input pulse. Thus, the circuit including the section of delay line 11 between end 15 and tap 19 can be considered to be the functional equivalent of a peaker or differentiating circuit in at least the above-mentioned respects. The reason for using a limiter circuit ahead of input 14 is now apparent, since a large negative input pulse would result in the generation at junction point 16 of a large positive pulse at the time of the trailing edge of the original input pulse, and this positive pulse would be coupled in the circuit shown to the grid of tube 12, turning the tube on and producing false operation of the circuit. The pulses represented by the waveforms of line C will be capacity coupled to the coil of delay line 11 and appear delayed by two microseconds across resistor 17. Referring to Fig. 1, the potential with reference to ground at the grid of tube 12 is the same as that at junction point 18, and this may be represented by $V_{ab}$ plus $V_{cd}$, where $V_{ab}$ is the voltage across resistor 17 with polarity as shown and $V_{cd}$ is the voltage from delay line shield 13 to delay line tap 19, which is connected to ground. According to elementary electrical network theory Let $V_{18}$ = grid to ground potential of tube 12
thus $$V_{18} = V_{ab} + V_{cd}$$

but the voltage, $V_{ba}$, across resistor 17 is equal to the voltage $V_{cd}$ delayed two microseconds or $V_{ba} = V_{cd}$ delayed two microseconds and, therefore $V_{ab} = -V_{ba} = -V_{cd}$ delayed two microseconds hence $V_{18} = V_{cd} + (-V_{cd}$ delayed two microseconds$)$ Line C in Fig. 2 represents the wave form of $V_{cd}$, and line D represents the wave form of $V_{cd}$ inverted and delayed two microseconds. Line E represents the wave form of $V_{18}$ which is the grid to ground potential of tube 12 and is simply the addition of the wave forms of lines C and D. With the bias on tube 12 adjusted by means of cathode resistor 24 as previously described, cutoff voltage of the tube will be as shown in line E, and also as there shown, the resultant pulses will be great enough at three separate times, which are separated by the time intervals between the original input pulses applied at input 14, to drive the grid of tube 12 above cutoff and hence cause the tube to conduct at these times. The output then at terminal 20 will be as shown in line F, three pulses, each of 0.4 microsecond duration, and each delayed two microseconds after its corresponding pulse applied to input 14 but with the time intervals between the pulses remaining unchanged. Tests have shown that this embodiment of the discriminator will not respond to pulses whose widths exceed the predetermined pulse width by more than 0.25 microsecond. This tolerance is of course controlled by the width of the pulses illustrated in line C of Fig. 2, which width in turn is controlled by the position of tap 19 on delay line 11. As is also apparent, delay line 11 should introduce a delay between tap 19 and the end connected to point 18 which is equal to the predetermined desired pulse width. Further, this section of delay line 11 between tap 19 and point 18 together with resistor 17 can be considered to be the functional equivalent of a delay-inversion circuit and the circuit associated with tube 12 can then be considered to be the functional equivalent of a coincidence circuit which receives the pulses of line C of Fig. 2 together with the pulses of line D to provide an output pulse for each coincidence of a positive pulse of line C with a positive pulse of line D.

It is to be understood that while the operation of the above embodiment of this invention has been described with reference to a single series of pulses, the embodiment is operable with a plurality of successive series or with a single pulse. Further, while a specific embodiment has been described as required by the patent statutes, the principles of this invention are of much broader scope. Numerous additional specific applications, as for example, employing a multivibrator for obtaining delay or a resistance-capacitance circuit for obtaining differentiating action as a substitute for the delay line sections shown, will occur to those skilled in the art and no attempt has been made to exhaust such possibilities. The scope of the invention is defined in the following claims.

What is claimed is:

1. A pulse width discriminator comprising, an electron tube normally biased beyond cut-off, a delay line comprising a thin inductive coil surrounded by a cylindrical outer shield, said coil being grounded at a point removed from the ends to provide two unequal time delay sections, a resistor whose impedance is equal to the characteristic impedance of said delay line, and means for impressing a series of similar pulses of electrical energy whose pulse width is equal to the time delay introduced by the longer of said time delay sections on one end of said resistor, on said shield, and on the end of said delay line nearest the grounded tap, the other end of said delay line and the other end of said resistor being connected together at a junction point, said tube being coupled between said junction point and ground and adapted to be driven to conduction to produce an output pulse for each of said pulses impressed on said discriminator.

2. A pulse width discriminator responsive to the application thereto of pulses of electrical energy of a predetermined time duration comprising, a delay line comprising a thin inductive coil surrounded by a cylindrical outer shield, said delay line being shorted at one end and terminated at its other end by a resistor having an impedance equal to the characteristic impedance of said delay line, said coil being tapped at a point removed from the ends to provide two unequal time delay sections, said section including the resistance termination having a time delay of a duration equal to said predetermined time duration, the other of said sections having a shorter delay than said predetermined time duration, means for impressing input pulses of electrical energy across said tap and said shield, and means for abstracting the output signal appearing between said tap and the end of said resistor connected to said coil.

3. A pulse width discriminator responsive only to negative pulses of electrical energy of a predetermined time duration applied thereto, said discriminator comprising, a delay line comprising a thin inductive coil surrounded by a cylindrical outer shield, said delay line being shorted at one end and terminated at its other end by a resistor having an impedance substantially equal to the characteristic impedance of said delay line, said coil being tapped at a point removed from the ends to provide two time delay sections, a point of reference potential, said tapping point being connected directly to said reference point, the section including said resistor termination having a time delay equal to said predetermined time duration, the other of said sections having a substantially shorter delay than said predetermined time duration, means for impressing negative input pulses of a predetermined amplitude across said reference point and said shield, an electron tube having at least an anode, a control grid and a cathode, a potential source positive with respect to said reference point, an impedance connecting said anode to said positive source, a capacitor connected between said cathode and said reference point, two resistors serially connected between said reference point and said positive source, the junction of said two resistors being connected to said cathode, the magnitude of the resistor connected between said cathode and said reference point being adjustable in resistance to control the potential at said cathode, said control grid being connected to that end of said resistor termination connected to said inductive coil of said delay line, said adjustable resistor being adjusted to have a resistance compared to the other of said two serially connected resistors to bias said cathode to a potential such that said tube is responsive only to those portions of the signal coupled to said control grid that have a positive amplitude greater than the negative amplitude of said input pulses.

4. A pulse width discriminator comprising, in combination, means for receiving a signal train of individual pulses, means for delaying and inverting said pulse train to produce a second train, means for combining said original pulse train as received and said second pulse train whereby constant amplitude control pulses representing the leading and trailing edges of the individual pulses in said received pulse train are obtained, means for delaying said control pulses by a predetermined time interval, means for combining said delayed control pulses with said undelayed control pulses whereby a double amplitude signal is obtained for each pulse in the incoming signal train having a duration equal to said predetermined time interval, and means responsive to the occurrence of a double amplitude pulse for producing an output pulse.

References Cited in the file of this patent

UNITED STATES PATENTS

| Number | Name | Date |
| --- | --- | --- |
| 2,227,052 | White | Dec. 31, 1940 |
| 2,266,154 | Blumlein | Dec. 16, 1941 |
| 2,299,571 | Dome | Oct. 20, 1942 |
| 2,465,840 | Blumlein | Mar. 29, 1949 |
| 2,489,297 | Labin | Nov. 29, 1949 |
| 2,508,569 | Forbes | May 23, 1950 |

FOREIGN PATENTS

| Number | Country | Date |
| --- | --- | --- |
| 528,192 | Great Britain | Oct. 24, 1940 |